Nov. 5, 1957  G. H. VANIMAN ET AL  2,811,990
PACKING APPARATUS AND METHODS
Filed July 23, 1956  2 Sheets-Sheet 1

INVENTORS
George H. Vaniman
Carsten O. Christensen
BY
Strauch Nolan & Neale
ATTORNEYS Nov. 5, 1957  G. H. VANIMAN ET AL  2,811,990
PACKING APPARATUS AND METHODS
Filed July 23, 1956                             2 Sheets-Sheet 2
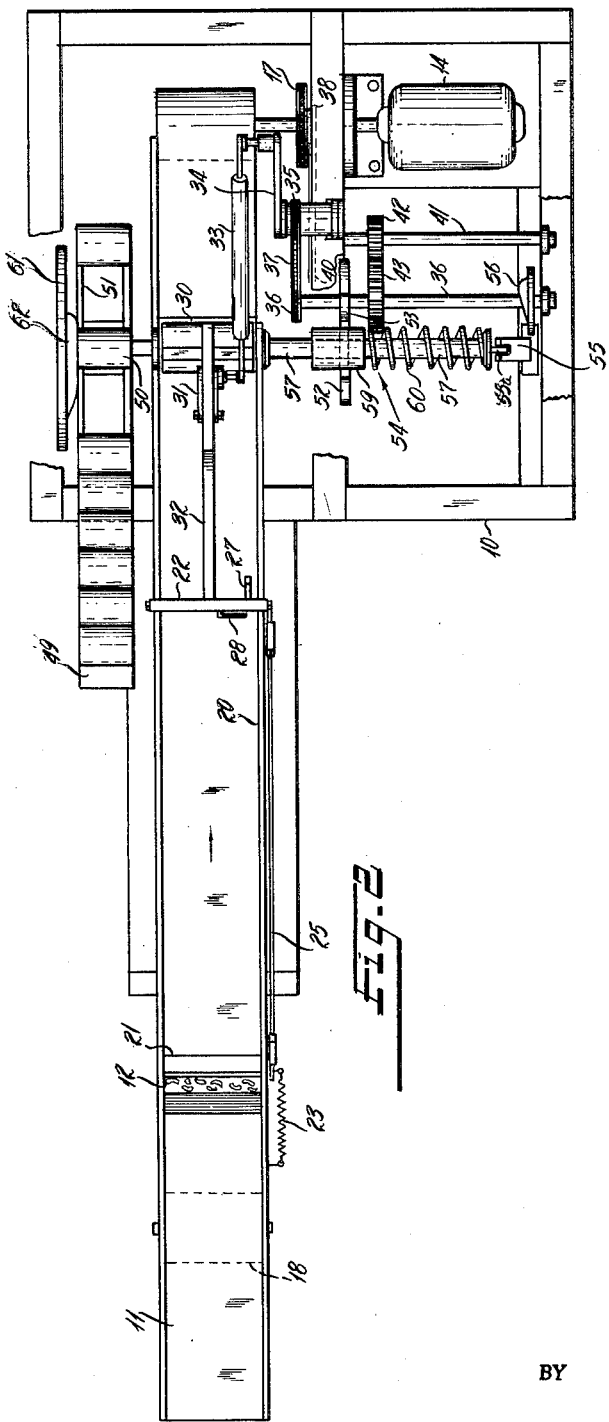
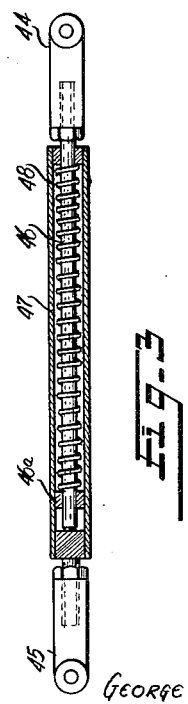
INVENTORS
GEORGE H. VANIMAN
CARSTEN O. CHRISTENSEN
BY
ATTORNEYS

United States Patent Office 2,811,990
Patented Nov. 5, 1957

2,811,990

PACKING APPARATUS AND METHODS

George H. Vaniman and Carsten O. Christensen, Bellingham, Wash.

Application July 23, 1956, Serial No. 599,656

6 Claims. (Cl. 141—12)

This invention relates to packing apparatus and methods. More particularly, it is concerned with apparatus and methods for molding and packing comestibles, especially elongated food products such as beans, asparagus, pickles, sausages and the like, into tin cans or other containers.

Existing machines (for example, see U. S. Patents 2,578,833 and 2,648,478) for shaping groups of comestibles and then packing them into cans have a plurality of molds mounted on an endless conveyor which runs past a filling station and a packing station. As the molds are moved along by the conveyor, they pick up a quantity of material to be packaged, close around it, and then move to a station where the contents of each mold are transferred into a container aligned with the mold. Such arrangement of endless conveyors with many molds positioned all along them in the existing comestible packing machines makes the machines cumbersome, expensive and complex.

It is an object of this invention to eliminate the complexity and expense of existing comestible packing machines by having only a single mold unit in such machines to which measured quantities of comestibles are delivered in properly timed sequence and from which the contents of the mold are transferred into a container.

It is a further object of the invention to provide a novel arrangement for operating the mold unit in timed relation with the section of the machine which feeds measured quantities of material to the mold unit.

It is another object of the invention to provide a simple mold closing mechanism which holds the movable and stationary sections of a mold together for a period of time sufficient to permit the food products to be molded to the desired shape.

It is also an object of the invention to provide blocking means cooperating with the feeding conveyor to stop the feed of measured quantities of foodstuffs to the mold when the mold is closed.

It is another object of the invention to provide a novel means for agitating and aligning elongated foodstuffs on a feeding belt.

It is an additional object of the invention to provide a simple low cost can filling unit which will be fast and efficient in operation and require a minimum of supervision.

Further objects and advantages will be apparent from the description in connection with the accompanying drawings in which:

Figure 2 is a top plan view, partly broken away, of the apparatus of Figure 1; and Figure 3 is an enlarged sectional view of the connecting rod which controls the movement of the movable section of the closure box of the apparatus of Figure 1.

Figure 1:
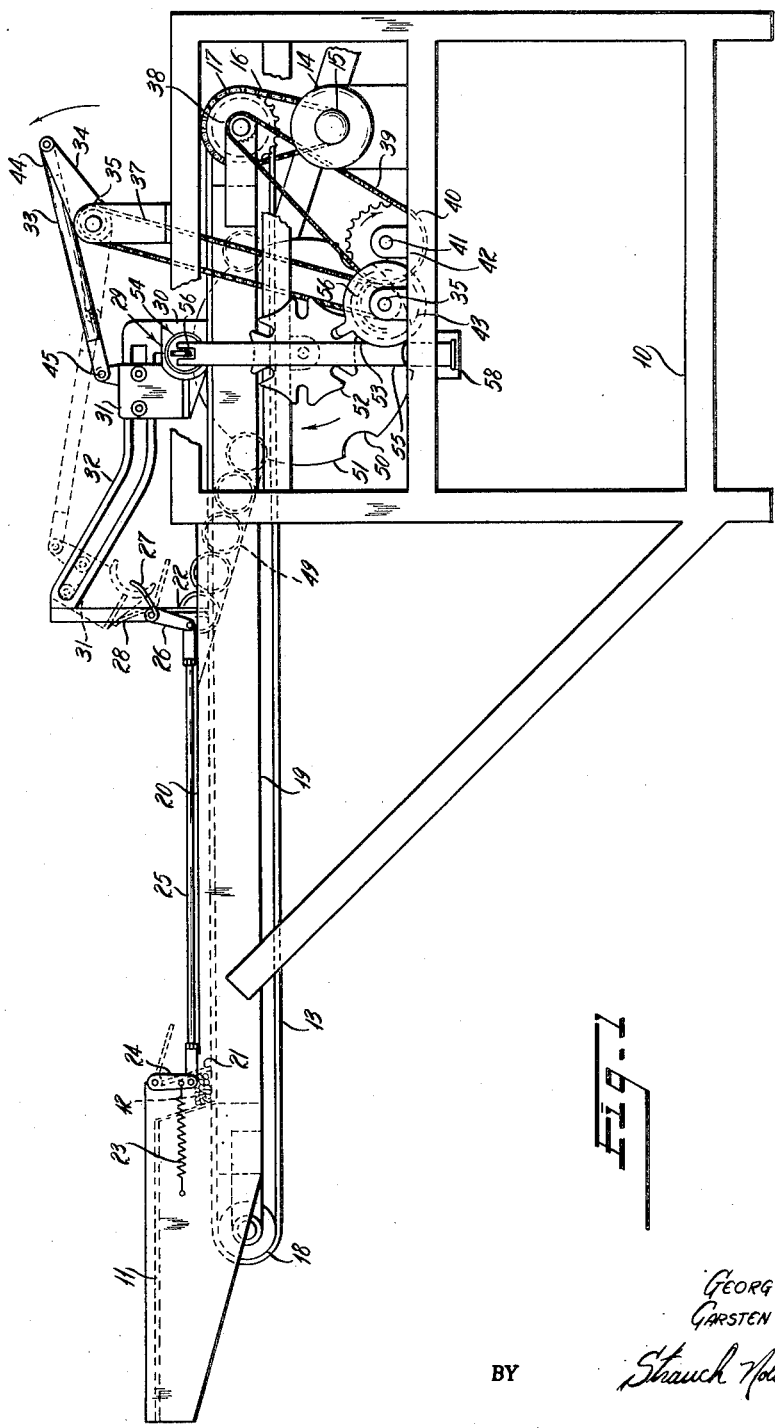
Figure 1 is a side elevation, partly broken away, of a preferred form of a comestible packing machine made according to this invention.

In the preferred form of the invention shown in the drawings, the apparatus is mounted on a main frame 10 that carries at one end a loading table 11 from which measured quantities of comestibles are delivered by the machine attendant into measuring pocket 12. An endless conveyor type carrying belt 13 is continuously driven by the power unit 14 through the drive sprocket 15, drive chain 16 and the driven sprocket 17. A rear idler pulley 18 supports the belt at the rear end of the pulley frame 19. Side guides 20 prevent the foodstuffs from falling off the belt.

A measuring pocket gate 21 and a holding gate 22 are positioned to block the movement of foodstuffs along belt 13. Gate 21 is biased by return spring 23 and is interconnected with holding gate 22 by means of measuring pocket gate arm 24, connecting link 25, and holding gate arm 26. An actuating arm 27 which moves gate 22 and in turn gate 21 is rigidly attached to holding gate 22. The opening movement of the holding gate 22 is limited by the holding gate arm stop 28.

A foodstuffs mold closure box 29 is formed by a stationary semi-circular closure box section 30 and a movable semi-circular closure box section 31. When the closure box sections are moved together, as shown in solid lines in Figure 1, they form a cylindrical mold for the comestibles.

The movable closure box section 31 is mounted for movement along guide 32. The movable closure box section 31 is reciprocated toward and away from the stationary closure box section by a crank and pitman arrangement comprising connecting arm 33 and drive arm 34. Drive arm 34 is rigidly connected with and rotated by sprocket 35. Drive shaft 36 drives the driven sprocket 35 by means of chains 37. Drive shaft 36 is driven from power unit 14 through drive sprocket 15, chain 16, sprocket 38, chain 39, sprocket 40, idler shaft 41 and gear 42, which is in mesh with gear 43 fixed on drive shaft 36.

Figure 3 shows in detail the construction of the telescoping extensible connecting arm 33 which provides for prolonged mold closing time. The ends 44 and 45 of the arm are movable relative to each other. End 44 is rigidly connected to rod 46 and end 45 is rigidly connected to tube 47. Spring 48 normally biases the rod 46 to a closed telescoped position within tube 47. When the mold sections 30 and 31 have moved together the end 45 is stationary and the end 44 and arm 34 will not have reached the end of their stroke, therefore arm 34 will exert a force on the connecting arm 33 and pull end 44 outwardly against the bias of spring 48. This will assure a closing force on the mold sections until the arm 34 starts to return the section 31 to its open position. A collar 46a may be moved along rod 46 and locked in any desired position by means not shown to adjust the initial compression on spring 48 to thus control the closing force exerted on mold section 31.

A suitable mechanism is provided for positioning a container in aligned relation with the closed mold sections. Containers C are fed down an inclined chute 49 into one of the pockets 50 of the sprocket 51. The sprocket 51 is driven in a step by step motion by the Geneva drive which has a female cam 52 driven by male cam 53 which is fixed to drive shaft 36.

A plunger assembly 54 is intermittently reciprocated in timed relation with the closing and opening of the closure box sections 30 and 31 to eject the contents of the mold into a container. A plunger operating arm 55 is intermittently reciprocated by the plunger arm cam 56 which is fixed to drive shaft 36. The upper end of the operating arm 55 has a roller 55a which abuts against the end of the plunger rod 57, and the lower end of the arm is pivotally mounted at 58 in frame 10. The plunger rod 57 is supported by bearing assembly 59 and is biased against the operating arm 55 by spring 60. The cam operator can be shaped and driven so as to move the plunger through the mold while it is in the closed position or, if desired, just as it begins to open. Movement during the full-closed position is best and the design of the connecting bar 33 provides for an appreciable dwell period permitting this to be accomplished without need for extremely close tolerances in the construction of the plunger and mold parts.

A suitable backstop for the rear end of the container to be filled is provided by plate 61 having cam portion 62 thereon for the purpose of positioning the container mouth adjacent the mold. Trimming devices may also be included adjacent the mold if desired to trim off outside portions of material held in the mold.

The operation of the apparatus is as follows: A quantity of elongated foodstuffs, measured by weight, volume, or number, are loaded into measuring pocket 12. The continual movement of belt 13 tends to agitate and align the elongated comestibles within the pocket. When movable closure box section 31 moves to the left, as shown in dotted lines in Figure 1, it contacts arm 27 and opens gates 21 and 22. The belt then conveys the measured quantity of foodstuffs from measuring pocket 12 toward holding gate 22, but before the measured quantity reaches holding gate 22 the movable mold section returns to its closed position and return spring 23 closes the gates 21 and 22. The comestibles are then held in place on the conveyor by holding gate 22 and are further agitated and aligned at this point. When the movable mold section again moves to the left opening gate 22, the measured quantity of foodstuffs is conveyed by the belt 13 into the stationary mold section 30 while a new and separate portion of comestibles travels to gate 22. The actuating mechanism then moves the section 31 into abutting relationship with section 30, thereby closing the mold or closure box 29. The guide 32 causes mold section 31 to move parallel with the belt 13 as it approaches the stationary mold section 30 and, hence, the movable section 31 will scoop up any material on the belt while closing.

The sprocket 51 positions a container in aligned relation with the mold and in synchronism with the closing of the sections. The plunger assembly 54 is also actuated in synchronism with the closing of the sections and it pushes the contents of the closed mold 29 to the container. After the container has been loaded by the plunger 57, it is advanced by sprocket 51 and delivered to a conveyor (not shown) for further handling, such as liquid filling and application of a top or closure to the container. The operation of the machine as explained is repeated so that continuously new loads of comestibles are transferred from the loading table 11 to end up properly aligned and packed into separate containers.

The foregoing description shows how the stated objects of the invention have been accomplished by the provision of a new form of packing apparatus which operates by a generally new mode of operation for this type of equipment, i. e., use of a single shaping mold or closure box rather than a plurality. The single mold composed of a movable section and stationary section reduces the complexity of this type of equipment along with its cost while at the same time provides for improved operation. In cooperation with the belt type conveying device and holding gates, a quick and effective alignment of the material to be packed is obtained all with a minimum of moving parts.

The new packing methods are especially well suited to processing of elongated comestibles because of the described alignment feature, but other materials may, of course, be processed. Likewise, although they are particularly adapted for manual grouping of materials, they may also be used with various types of mechanical loading or measuring devices because the included measuring and holding stations permit this adaptation to be easily made.

The specific description and illustration are of the preferred form of the invention. It will be apparent to those skilled in the art that various modifications and changes may be made particularly in the form and relation of parts without departing from the spirit of the invention as defined in the appended claims.

We claim:

1. Apparatus for packing comestibles into containers comprising: a conveyor adapted to traverse a loading station and a filling station; a stationary mold closure box section fixedly mounted at said loading station; a movable mold closure box section, means for moving said movable section toward and away from said first section and up away from said conveyor; means for blocking said conveyor when said sections are closed; means for positioning a container at said filling station in aligned relation with said stationary section; and means for transferring the contents of the mold formed by the movable and stationary sections when in juxtaposition into said container.

2. Apparatus for packing a measured quantity of elongated foodstuffs into a container comprising: a conveyor adapted to traverse a measuring station, a holding station, and a filling station; a mold at said filling station, said mold formed of a stationary section and a movable section; means for intermittently reciprocating said movable section toward and away from said stationary section; and stop means for stopping the travel of materials along said conveyor at said holding station, said stop means operable in timed relation with said means for moving said movable section, whereby a measured quantity of material will be delivered to said stationary section by said conveyor only when said movable section is moved away from said stationary section.

3. Apparatus for loading a measured quantity of comestibles into a container comprising: an endless conveyor adapted to traverse a measuring station, a holding station and a filling station; a pair of interconnected gate members for blocking the travel of foodstuffs along said conveyor at said measuring and said holding stations; a sectional mold having a stationary section and a movable section; the stationary section being fixed at said filling station; means for reciprocating said movable section toward and away from said stationary section, said means also operable to open said interconnected gate members, whereby a measured quantity of comestibles will be delivered to said stationary section by said conveyor when said movable section is moved away from said stationary section; means for positioning a container in aligned relation with said mold at said filling station; and means operable in timed relation with said first recited means for transferring the contents of said mold to said container.

4. Apparatus for packing comestibles into cans or other containers comprising: an endless belt conveyor which runs in a horizontal plane past a measuring station, a holding station and a filling station; a gate member pivoted above said conveyor at said measuring station; a second gate pivoted above said conveyor at said holding station; means interconnecting said gates for movement together; spring means biasing said gates to a closed position blocking the travel of material along said conveyor; a semi-circular stationary mold section fixed above said conveyor at said filling station; a semi-circular movable mold section adapted to form a comestible containing mold when juxtapositioned with said stationary section; a movable mold section driving means for reciprocating said movable section to and away from said stationary section; an elongated cam element for guiding said movable section in a generally horizontal path which runs parallel with said conveyor along the portion closest to said stationary section and then upwardly away from said conveyor; means for moving said gates against their biasing means to open them whereby measured quantities of comestibles are moved from said measuring station to said holding station and from said holding station to said filling station by said conveyor when said movable section moves away from said stationary section; means for positioning a container in aligned relation at said filling station with said comestible containing mold; and a plunger operated by a cam driven lever for pushing the contents of said mold into said positioned container.

5. Apparatus as claimed in claim 4 wherein said movable mold section driving means comprises a rotatable drive arm connected to said movable section by a two-section telescoping connecting arm that includes a spring which biases the two arm sections to a closed telescoped position.

6. A method of packing a measured quantity of elongated comestibles into a container which comprises: moving a measured quantity of comestibles along a horizontal path by resting the comestibles on a horizontally traveling web; blocking said movement of the comestibles by the interposition of a vertically extending web while continuing the forward movement of said traveling web whereby the comestibles are tumbled into general alignment with one another; withdrawing said blocking web to permit said comestibles to again continue forward movement with said traveling web; molding said aligned comestibles into a cylindrical group by bringing them on said traveling web into contact with a semi-circular member and then bringing a second mating semi-circular member into contact with the comestibles by moving the second member into juxtaposition with said first member along the same path traveled by said comestibles and finally pushing the molded comestibles into a container.

References Cited in the file of this patent

UNITED STATES PATENTS

| | | |
|---|---|---|
| 281,767 | Jensen | July 24, 1883 |
| 1,762,443 | Krueger | June 10, 1930 |
| 2,452,666 | Kuther et al. | Nov. 2, 1948 |
| 2,542,133 | Gorley | Feb. 20, 1951 |